United States Patent [19]

Hidari

[11] Patent Number: 5,777,756
[45] Date of Patent: Jul. 7, 1998

[54] VIDEO PROCESSING APPARATUS WITH MULTIPLE IMAGE SIGNAL INTEGRATION AND REDUCTION FOR DECREASING NOISE

[75] Inventor: Hirofumi Hidari, Kawasaki, Japan

[73] Assignee: Nikon Corporation, Tokyo, Japan

[21] Appl. No.: 444,519

[22] Filed: May 19, 1995

Related U.S. Application Data

[63] Continuation of Ser. No. 54,213, Apr. 30, 1993, abandoned.

[30] Foreign Application Priority Data

May 20, 1992 [JP] Japan ................................. 4-127652

[51] Int. Cl.$^6$ .................................................. H04N 1/40
[52] U.S. Cl. .......................... 358/455; 358/460; 358/463; 358/479; 348/618; 348/619; 348/701; 382/254
[58] Field of Search ........................ 358/479, 463, 358/108, 909, 167, 155, 156, 157, 455, 460; 348/618, 619, 620, 607, 699, 700, 701, 702, 135, 143, 241, 364; 382/254; H04N 1/40

[56] References Cited

U.S. PATENT DOCUMENTS

| | | | |
|---|---|---|---|
| 4,031,364 | 6/1977 | Wilmot | 348/620 |
| 4,160,998 | 7/1979 | Kamin | 358/105 |
| 4,303,943 | 12/1981 | May | 348/619 |
| 4,334,237 | 6/1982 | Reitmeier et al. | 348/619 |
| 4,392,128 | 7/1983 | Bruggemann | 358/36 |
| 4,408,228 | 10/1983 | Mahony | 348/620 |
| 4,523,229 | 6/1985 | Kanmoto | 348/619 |
| 4,581,642 | 4/1986 | Poetsch et al. | 348/620 |
| 4,876,734 | 10/1989 | Kawamura | 382/54 |
| 4,987,481 | 1/1991 | Spears et al. | 348/620 |
| 5,019,908 | 5/1991 | Su | 348/620 |
| 5,303,051 | 4/1994 | Levesgue et al. | 348/31 |
| 5,442,462 | 8/1995 | Guissin | 358/463 |

OTHER PUBLICATIONS

Rainer, L.R. & Gold. B. (1975) Theory & Application of Digital Signal Processing. Prentic-Hall In Englewood Cliffs, N.J., pp. 205–209.

Gelb, A. edt. (1974) Applied Optical Estimation, Technical Staff, The Analytic Sciences Corporation. M.I.T. Press, Cambridge, Mass. "Moving Average to Decrease Noise", Real Time Video Image Processing. Quantex Corporation (no date given).

Primary Examiner—Thomas L. Stoll

[57] ABSTRACT

A video processing apparatus uses multiple image signal integration and reduction for decreasing noise. A television camera picks up an image of a still object and outputs image signals repetitively. An adder adds each newly outputted signal to the sum of previously outputted image signals stored in a memory and stores each new sum of image signals in the memory. A circuit divides each new sum of image signals by the number of times the adder has performed additions, thereby providing a signal that is displayed on a monitor.

3 Claims, 3 Drawing Sheets

VIDEO PROCESSING APPARATUS WITH MULTIPLE IMAGE SIGNAL INTEGRATION AND REDUCTION FOR DECREASING NOISE

This application is a continuation, of application Ser. No. 08/054,213, filed Apr. 30, 1993, now abandoned.

BACKGROUND OF THE INVENTION

1. Field of the Invention

The present invention relates to an image processing apparatus which reduces a noise component included in still image data.

2. Related Background Art

An image processing apparatus which reduces a noise component included in still image data by integrating the still image data supplied from an image pickup unit has been known.

In such an image processing apparatus, the noise component is reduced in the following manner. When the image pickup unit pick up an image of a still object, still image data which is repetitively produced should be identical unless an image pickup condition such as illumination changes. However, the respective still image data include some noise components which are randomly superimposed on the still image data.

Thus, the still image data including the noise is integrated by a predetermined number of times N per screen and the integrated still image data is divided by the number of times N of integration to generate one screen of still image data. The generated still image data is equal to the original still image data picked up by the image pickup unit except the noise component, and the noise component initially superimposed on the still image data is reduced by a factor of N.

FIG. 3 shows a configuration of a prior art image processing apparatus. Still image data picked up by an image pickup unit is supplied to the image processing apparatus 1 for each screen. It is converted to a digital signal by an A/D converter 2 and then it is supplied to an adder 3. In the adder 3, previous still image data stored in an image memory 4 is added to the presently picked-up still image data, and the summed still image data is again stored into the image memory 4. A multiplexor 5 divides the still image data supplied from the image memory 4 by the number of times of integration to generate still image data for one screen, and supplies it to a D/A converter 6. Those units 2–6 are controlled by a system controller 7.

Assuming that the still image data supplied from the image pickup unit is 8-bit data, the A/D converter 2 and the D/A converter 6 are of 8-bit units, and a memory capacity of the image memory 4 is 12 bits, then a maximum number of times of integration in the adder 3 is $$2^{12}/2^8 = 2^4 = 16$$

On the other hand, since the D/A converter 6 which supplies one screen of still image data to the monitor is an 8-bit unit, it is necessary to compress the 12-bit still image data of the image memory 4 to the 8-bit still image data by the multiplexor 5. Thus, the multiplexor 5 extracts high order 8 bits of the 12-bit still image data supplied from the image memory 4 and supplies them to the D/A converter 6. Namely, it reduces the still image data supplied from the image memory 4 by a factor of 16.

When noise reduction process is not to be executed, the multiplexor 5 supplies low order 8 bits of the 12-bit still image data supplied from the image memory 4 to the D/A converter 6. Namely, it supplies the still image data supplied from the image memory 4 as it is without reducing it.

The D/A converter 6 converts the 8-bit still image data supplied from the multiplexor 5 to an analog signal and supplies it to a monitor, not shown, for display. The image displayed on the monitor is identical to the image picked up by the image pickup unit but the noise superimposed on the initial still image data has been reduced by the factor of the number of times of integration. For example, when the number of times of integration is 16, one noise component is reduced to $1/16$ of the initial component.

However, in the prior art image processing apparatus, since the still image data is reduced by the multiplexor by the factor of the number of times of integration during the integration, the image displayed on the monitor is dark until the noise reduction process is completed after the predetermined number of times of integration.

SUMMARY OF THE INVENTION

It is an object of the present invention to provide an image processing apparatus which can display a normal and bright image even during the noise reduction process of the still image data.

In order to achieve the above object the image processing apparatus of the present invention comprises integration means for integrating still image data produced by picking up an image of a still object and modification means for modifying the still image data integrated by the integration means for each integration in accordance with the current number of times of integration and outputting the modified data.

In the image processing apparatus of the present invention, the integrated still image data is modified for each integration in accordance with the current number of times of integration. As a result, the modified still image data is identical to he initially supplied still image data except the noise component while the noise component is reduced for each integration.

DETAILED DESCRIPTION OF THE PREFERRED EMBODIMENTS

Figure 1:
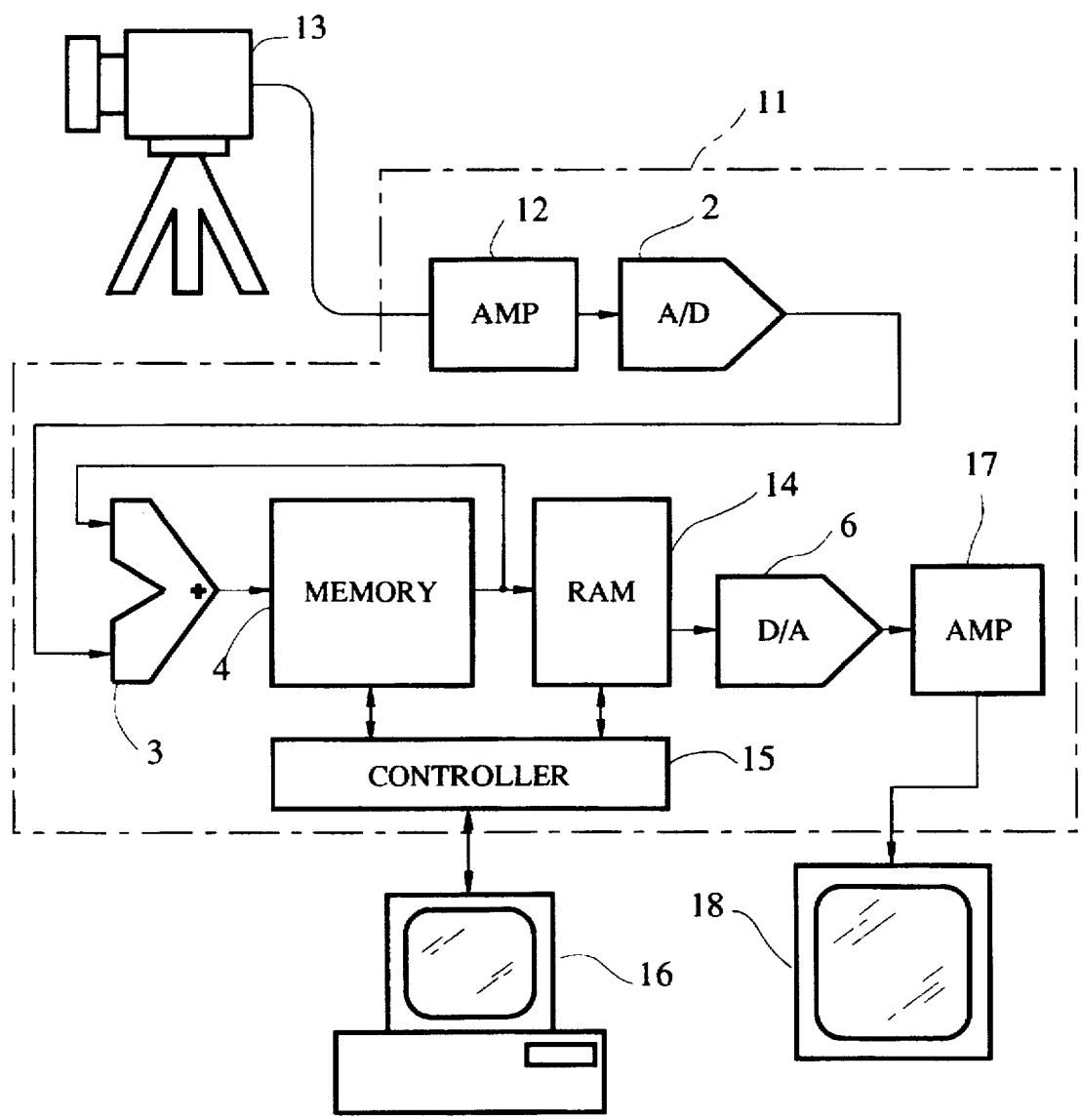
FIG. 1 shows a block diagram of a configuration of one embodiment of the present invention.

FIG. 1 shows a configuration of one embodiment of the present invention. The like elements to those of FIG. 3 which shows a prior art apparatus are designated by the like numerals and only the differences are explained.

Figure 3:
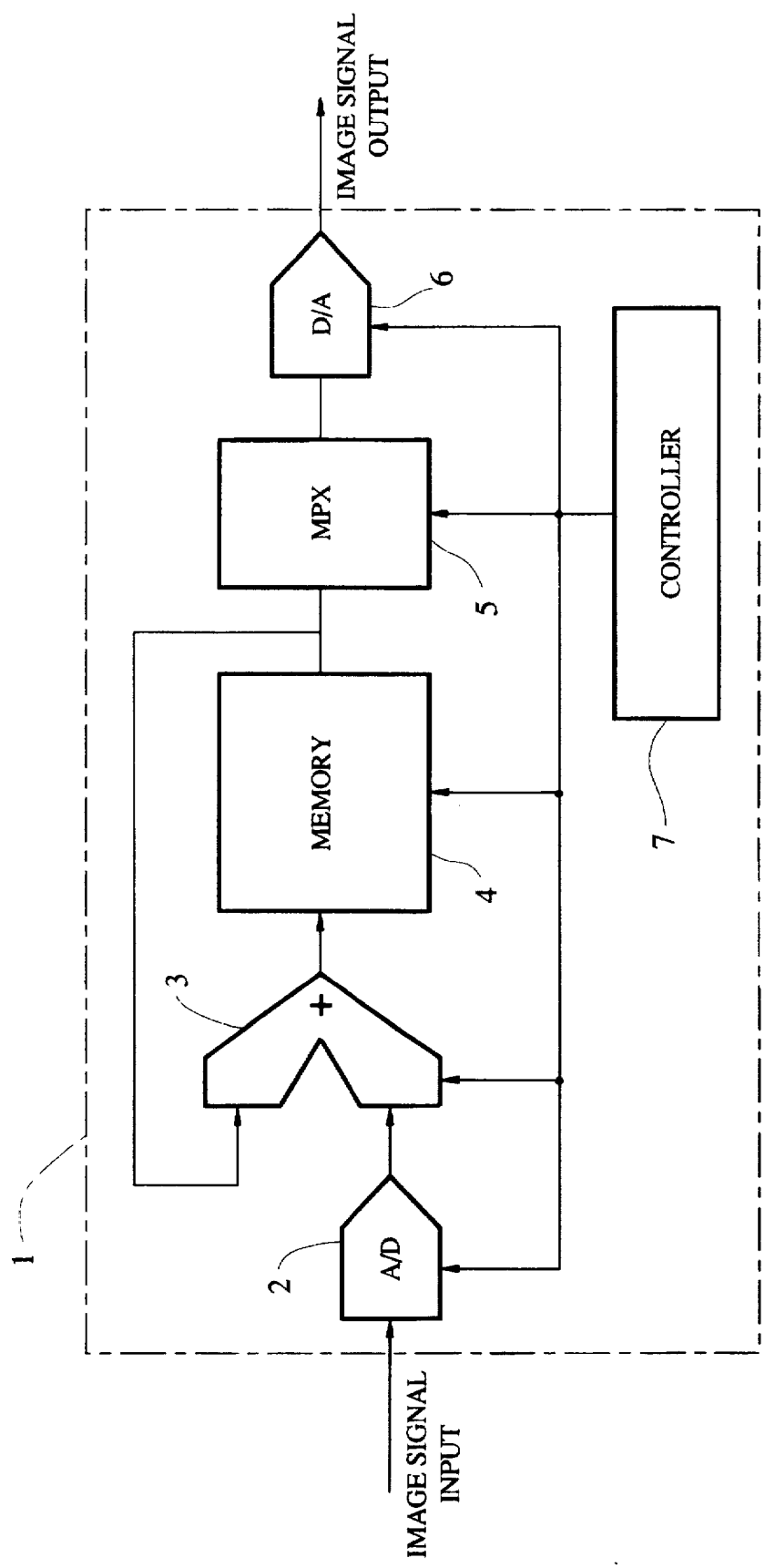
FIG. 3 shows a block diagram of a configuration of a prior art image processing apparatus.

The following units are added to the image processing unit 11, compared to the prior art image processing apparatus shown in FIG. 3. Numeral 12 denotes an input amplifier which amplifies a still image signal picked up by a TV camera 13. The still image data is 8-bit data.

Numeral 14 denotes a pallete RAM which modifies the still image data supplied from the image memory 4 for each integration in accordance with the number of times of integration. At the start of integration (first integration), it outputs the input image data as it is, and at n-th integration, it modifies the n-fold input image data by a factor of $1/n$.

When the noise reduction process is not to be conducted, the pallet RAM 14 is set to output the same data as the input data. Numeral 15 denotes a system controller which controls the respective units and controls the exchange of the still image data between the image memory 4 and the host computer 16. Numeral 17 denotes an output amplifier which amplifies the analog still image data supplied from the D/A converter 6 and supplies it to a monitor 18 for displaying an image.

Figure 2:
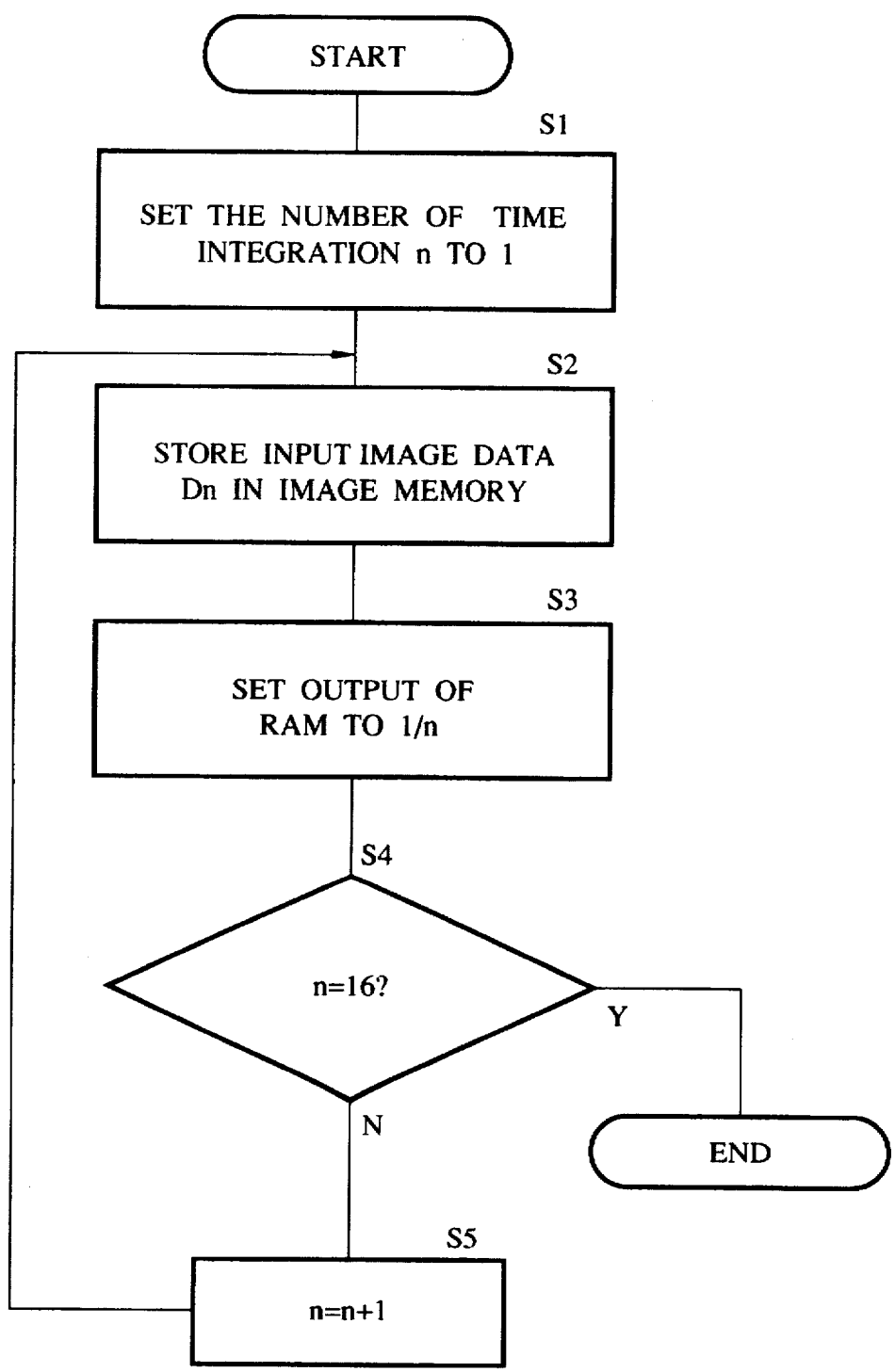
FIG. 2 shows a flow chart of an image processing operation of a system controller.

FIG. 2 shows a flow chart of an operation of the system controller 15. The image processing operation of the present embodiment is explained with reference to the flow chart.

The still image signal picked up by the TV camera 13 is amplified by the input amplifier 12 and converted to the 8-bit digital signal by the A/D converter 2, and then it is supplied to the adder 3. In the adder 3, the latest still image data and the image data previously integrated and stored in the image memory 4 are summed.

In a step S1, the system controller 15 sets "1" indicating the number of times n integration into a register, and in a step S2, it stores still image data Dn supplied from the adder 3 into the image memory 4. In a step S3, it controls the pallet RAM 14 so that the output of the pallet RAM 14 is equal to 1/n of the input thereto. In a step S4, it checks if the number of times n of integration has reached 16. If 16 times of integration have been completed, the process is terminated, and if they have not yet been completed, the process proceeds to a step S5. In the step S5, the number of times n of integration is incremented and the process returns to the step S2 to continue the above steps.

As a result, at the start of integration, the input initial still image data D1 is stored as it is into the image memory 4 through the adder 3 and it is also supplied to the pallet RAM 14. Since the pallet RAM 14 is set such that it produces the same output as the input, the first still image data D1is outputted as it is to the D/A converter 6 and it is amplified by the output amplifier 17 for the display by the monitor 18.

At the second time, the second picked-up still image data D2 is added by the adder 3 to the first still image data D1 stored in the image memory 4 and the still image data D1+D2 is stored into the image memory 4. It is also supplied to the pallet RAM 14. Since the pallet RAM 14 is now set such that the output thereof is one half of the input thereto, the pallet RAM 14 outputs the 8-bit still image data equal to (D1+D2)/2 to the D/A converter 6, and it is amplified by the output amplifier 17 for display by the monitor 18.

At the third time, the third picked-up still image data D3 is added to the first to second integrated still image data D1+D2 stored in the image memory 4, and the still image data D1+D2+D3 is stored into the image memory 4. It is also supplied to the pallet RAM 14. Since the pallet RAM 14 is now set such that the output thereof is ⅓ of the input thereto, the pallet RAM 14 outputs the 8-bit still image data (D1+D2+D3)/3 to the D/A converter 6, and it is amplified by the output amplifier 17 for display by the monitor 18.

At the fourth or subsequent time, the latest still image data is similarly added by the adder 3 to the still image data previously integrated and stored in the image memory 4, and the summed still image data is stored in the image memory 4 and also supplied to the pallet RAM 14. In the pallet RAM 14, the output is reduced for each integration in accordance with the number of times n of integration so that the 8-bit still image data is always supplied to the D/A converter 6. The still image data is amplified by the output amplifier 17 and displayed on the monitor 18.

Since the integrated still image data is reduced for each integration in accordance with the current number of times n of integration, the darkening of the displayed image on the monitor 18 during the noise reduction process is prevented, and the noise component is reduced as the number of times n of integration increases so that the image changes clearer and clearer.

When the noise reduction process is not to be conducted, the pallet RAM 14 may be used as an ordinary pallet RAM to perform gamma conversion of the video output.

In the present embodiment, it is assumed that the still image data is 8-bit data, the A/D converter 3 and the D/A converter 6 are of 8-bit unit and the image memory 4 is of 12-bit unit, although they are not restrictive. Also, any number of times n of integration may be set.

In accordance with the present invention, since the integrated still image data is modified for each integration in accordance with the current number of times n of integration and the modified data is outputted, the normal and bright image can be displayed even during the noise reduction process of the still image data.

What is claimed is:

1. An image processing apparatus for reducing noise in an analog image signal corresponding to a plurality of repetitive images of a still object scene output by a television camera comprising:

an A/D converter for converting the analog image signal to a digital image signal;

a memory for storing the digital image signals;

an adder, having inputs connected to the output of the A/D converter and the output of the memory, which adds each outputted digital image signal from the A/D converter to the contents stored in the memory, and the output of the adder being connected to the input of the memory such that the output of the adder is stored in the memory;

a pallet RAM connected to the output of the memory which divides each sum of digital image signals by a denominator equal to the number of times the adder has performed addition and outputs a resultant image signal having a brightness level approximately equal to a brightness level of the image signals and a noise level less than a noise level of the image signals, every time the adder performs addition; and a controller which sets the denominator in the pallet RAM based upon the number of times the adder has performed additions for each still object scene.

2. An image processing apparatus according to claim 1, wherein the circuit performs the division by multiplying the extracted sum by 1/N, where N is the denominator.

3. An image processing apparatus, as set forth in claim 1, wherein the pallet RAM is adapted to perform gamma correction on the resultant image signal.

* * * * *

UNITED STATES PATENT AND TRADEMARK OFFICE
CERTIFICATE OF CORRECTION

PATENT NO. : 5,777,756
DATED : July 7, 1998
INVENTOR(S) : Hirofumi Hidari

It is certified that error appears in the above-indentified patent and that said Letters Patent is hereby corrected as shown below:

Title page,  [63] change "Ser. No. 54,213" to
--Ser. No. 054,213--;
[56] change Reference No. "4,392,128" to
--4,392,123--.

Signed and Sealed this

Eighth Day of December, 1998

*Attest:*

*Attesting Officer*

BRUCE LEHMAN

*Commissioner of Patents and Trademarks*